(12) United States Patent
Tanaka et al.

(10) Patent No.: US 10,090,509 B2
(45) Date of Patent: Oct. 2, 2018

(54) PROTECTION ELEMENT

(71) Applicant: Littelfuse Japan G.K., Kawasaki (JP)

(72) Inventors: Arata Tanaka, Ryugasaki (JP); Hisashi Usui, Kashima (JP); Keiichiro Nomura, Chiba (JP)

(73) Assignee: Littelfuse Japan G.K., Tokyo (JP)

( * ) Notice: Subject to any disclaimer, the term of this patent is extended or adjusted under 35 U.S.C. 154(b) by 158 days.

(21) Appl. No.: 14/424,398

(22) PCT Filed: Aug. 30, 2013

(86) PCT No.: PCT/JP2013/073268
§ 371 (c)(1),
(2) Date: Oct. 31, 2015

(87) PCT Pub. No.: WO2014/034835
PCT Pub. Date: Mar. 6, 2014

(65) Prior Publication Data
US 2016/0099458 A1    Apr. 7, 2016

(30) Foreign Application Priority Data
Aug. 31, 2012    (JP) ................................. 2012-192162

(51) Int. Cl.
*H01H 85/08*     (2006.01)
*H01M 2/34*      (2006.01)
*H01M 10/0525*   (2010.01)

(52) U.S. Cl.
CPC ............ *H01M 2/348* (2013.01); *H01H 85/08* (2013.01); *H01M 2/34* (2013.01); *H01M 10/0525* (2013.01); *H01M 2200/106* (2013.01)

(58) Field of Classification Search
CPC .... H01M 2/34; H01M 2/348; H01M 10/0525; H01M 2200/106; H01H 85/08
(Continued)

(56) References Cited

U.S. PATENT DOCUMENTS 2,911,504 A * 11/1959 Cohn ................... H01G 9/0003
                                                337/159
4,320,374 A *  3/1982 Narancic ............... H01H 85/06
                                                337/162
(Continued)

FOREIGN PATENT DOCUMENTS

CN     102089834 A    6/2011
CN     102568969 A    7/2012
(Continued)

OTHER PUBLICATIONS

JP-2002-42632_English_Translation, Feb. 8, 2002.*
(Continued)

*Primary Examiner* — Anatoly Vortman (57) ABSTRACT

The present invention provides a protection device which includes: a PTC laminar element which is formed of an insulation resin and has at least one throughhole; electrically conductive metal thin layers which are positioned on each of main surfaces of the laminar element, and a fuse layer which is positioned on a side surface defining at least one of said at least one throughhole and electrically connects the electrically conductive metal thin layers which are positioned on each of main surfaces of the laminar element. The protection device of the present invention allows a larger amount of a current to flow therethrough and can provide a protection from an excessive current.

11 Claims, 3 Drawing Sheets

(58) Field of Classification Search
USPC .......................................................... 337/416
See application file for complete search history.

(56) References Cited

U.S. PATENT DOCUMENTS

| | | | | |
|---|---|---|---|---|
| 4,652,848 | A * | 3/1987 | Hundrieser | H01H 85/046 337/297 |
| 5,708,553 | A * | 1/1998 | Hung | H01C 7/13 337/114 |
| 5,712,610 | A * | 1/1998 | Takeichi | H01H 85/046 29/623 |
| 6,198,376 | B1 * | 3/2001 | Ishikawa | H01H 37/761 337/159 |
| 6,351,361 | B1 * | 2/2002 | Kawazu | H01H 85/463 337/290 |
| 6,445,277 | B1 * | 9/2002 | Ishikawa | H01C 7/12 337/290 |
| 6,855,008 | B1 * | 2/2005 | Freitag | H01H 85/044 439/620.26 |
| 6,902,434 | B2 * | 6/2005 | Stack | H01H 85/044 337/187 |
| 7,172,462 | B1 * | 2/2007 | Gronowicz, Jr. | H01H 85/044 439/620.26 |
| 7,180,719 | B2 * | 2/2007 | Whitney | H01C 7/021 361/103 |
| 7,924,137 | B2 * | 4/2011 | Rahman | H01H 85/044 337/158 |
| 2009/0027821 | A1 * | 1/2009 | Colby | H01C 7/02 361/104 |
| 2012/0092123 | A1 | 4/2012 | Goldstein et al. | |
| 2013/0196182 | A1 * | 8/2013 | Tanaka | H01C 1/1406 429/7 |
| 2015/0333497 | A1 * | 11/2015 | Nomura | H01H 85/11 361/103 |

FOREIGN PATENT DOCUMENTS

| | | |
|---|---|---|
| CN | 102737797 A | 10/2012 |
| JP | 10501374 A | 2/1998 |
| JP | 10-275546 A | 10/1998 |
| JP | 2002-42632 A | 2/2002 |
| JP | 2004185960 | 7/2004 |
| JP | 2007-28087 A | 10/2007 |
| JP | 2007280807 A | 10/2007 |
| JP | 2009-32696 A | 2/2009 |
| TW | 201241858 A | 10/2012 |

OTHER PUBLICATIONS

International Search Report for International Application No. PCT/JP2013/073268, dated Nov. 26, 2013.
International Search Report for International Application No. PCT/JP2013/073264, dated Dec. 3, 2013.
Kazuo Ohmine et al., "Cylindrical Lithium Ion Battery "CGR26650" for Power Tools", *Matsushita Technical Journal*, vol. 52, No. 4, Aug. 2006, pp. 31-35.

* cited by examiner

PROTECTION ELEMENT

FIELD OF THE INVENTION

The present invention relates to a protection device which protects an electrical apparatus, in particular to a protection device which protects an electrical element or a circuit which is included in an electrical apparatus. For example, the present invention relates to a protection device which interrupts an excessive current when the excessive current flows through an electrical apparatus such as a secondary battery. That is, the present invention relates to an excessive current protection device.

BACKGROUND OF THE INVENTION

A thermal fuse device, a current fuse device, a polymer PTC device, or the like is used as a protection device which interrupts an excessive current when the excessive current flows during charging or discharging of a cylindrical lithium-ion secondary battery. In particular, the polymer PTC device is useful in that it can be positioned by incorporating into a sealing plate of the secondary battery, a battery pack which is particularly composed of many of the secondary batteries, to be compact. However, a commercially available PTC component is disadvantageous compared to a fuse device consisting of a metal when a large amount of current is passed through the PTC component because the PTC component has a larger resistance than the metal.

In view of the above described problem, it was proposed, for example, that a spacer is used in place of the PTC device inside the sealing plate in the cylindrical lithium-ion secondary battery cell (see the Matsushita Technical Journal reference referred to below). However, when the spacer is used, there is a problem that a protection from the excessive current cannot be ensured.

The fuse device as a protection device used in a secondary battery is advantageous in that it has a low resistance and can pass a large amount of current. However, since the fuse device is not directly disposed in a cell inside but is disposed on a side surface of the battery or a connecting portion between the batteries, there is a disadvantage that a battery pack becomes larger. In addition, when an excessive current is passed through a circuit, the fuse device protects the circuit by blowing (fusing) to interrupt the excessive current, while there is a disadvantage that once the fuse device blows, the cell cannot be used.

Matsushita Technical Journal, Vol. 52, No. 4, August 2006, pp. 31-35, is a prior reference.

SUMMARY OF THE INVENTION

The problem to be solved by the invention is to provide a protection device which allows a larger amount of current to flow while providing a protection from an excessive current, and further a resettable function after a cause for the excessive current is eliminated.

In the first aspect, the present invention provides a protection device which comprises a PTC laminar element which is formed of a PTC composition and has at least one throughhole, an electrically conductive metal thin layer which is positioned on each of main surfaces of the PTC laminar element, and a fuse layer which is positioned on a side surface defining at least one of said at least one throughhole and electrically connects the electrically conductive metal thin layers each of which is positioned on each of the main surfaces.

In the second aspect, the present invention provides an electrical apparatus such as a secondary battery which comprises the protection device of the present invention as described above and below.

The protection device of the present invention comprises the PTC laminar element which is formed of a PTC composition, and the PTC laminar element has at least one throughhole. This throughhole extends along the thickness direction of the PTC laminar element and passes through the PTC laminar element. Its cross-section shape in the direction perpendicular to the thickness direction is not particularly limited, and for example, it is preferably a circular shape. However, the cross-section shape may be other shape, for example, a square shape, a rhombus shape, a rectangle shape or an ellipse shape. The number of the throughholes is at least one. In other words, the number is 1, 2 or more, and for example, it may be 2, 3, 4, or 5. The number may be appropriately selected depending on a degree of the protection which is required for the protection device. When the PTC laminar element has one throughhole, the throughhole is positioned at the center of the laminar element, that is, at the center of the cross-section in the direction perpendicular to the thickness direction.

The PTC composition constituting the PTC laminar element may be a composition known per se and is not particularly limited as long as it can be used in the protection device of the present invention. For example, the PTC composition may be obtained by forming a polymer composition containing an electrically conductive filler (for example, a high density polyethylene containing a carbon black particulate material in its dispersion state) and showing a PTC property into a laminar shape, for example, by extrusion-molding. In particular, the PTC composition may be one showing a PTC property used in the device described in JP 10-501374 A.

A thickness of the PTC laminar element is not particularly limited but is, for example, 0.1-0.7 mm, preferably 0.2-0.6 mm. When the thickness of the PTC laminar element is more than 0.7 mm, it is difficult to install the protection device inside the existing secondary battery. When the thickness of the PTC laminar element is less than 0.1 mm, it is difficult to produce the PTC laminar element by extrusion molding and there is a disadvantage in view of its stability and production cost.

This PTC laminar element comprises the electrically conductive metal thin layers which are disposed on the main surfaces of its both sides. Such electrically conductive metal thin layer is not particularly limited as long as it is a thin layer (for example, a layer having about 0.1 μm-100 μm of thickness) of a metal having an electrically conductive property. For example, the metal thin layer can be made of a metal such as copper, nickel, aluminum, gold or the like and may be formed from multiple metal layers.

The PTC laminar element on each main surface of which the electrically conductive metal thin layer is positioned on each of its main surfaces can be produced by simultaneously extruding the PTC composition which constitutes the PTC laminar element together with metal sheets (or metal foils) which constitute the metal thin layers to obtain an extruded product in which the PTC composition is sandwiched between the metal sheets (or the metal foils). In other embodiment, the PTC laminar element can be produced by obtaining a laminar product of the PTC composition, for example by extruding, sandwiching the laminar product between the metal sheets (or the metal foils), and thermally-compressing them together such that they become integral to obtain a pressure-bonded product. Such extruded product (or such pressure-bonded product) is in the state where a plurality of the PTC laminar elements of the PTC composition which has the electrically conductive metal thin layers on its both main surfaces are aggregated adjacently to each other. The extruded product (or the pressure-bonded product) is cut into a prescribed shape having a prescribed size to obtain a single PTC laminar element having the electrically conductive thin layers.

Furthermore, in other embodiment, the electrically conductive metal thin layer may be formed on each of the main surfaces of the PTC laminar element by plating the laminar element with an electrically conductive metal. Also in this case, it is preferable to obtain an aggregate product as described above, and then, divide it into individual laminar elements.

When the plating is conducted as described above, it is preferable to make a separate metal layer, particularly preferably a metal foil, adhere tightly to each of the main surfaces of the PTC laminar element beforehand, for example, by extruding or thermally-compressing similarly as described above. In this case, it is preferable to form the electrically conductive metal thin layer on the separate metal layer by plating. When the electrically conductive metal thin layer is formed by plating, this has an advantage in that the plated layer as the electrically conductive metal thin layer adheres tightly to the separate metal layer which already adheres tightly to the PTC laminar element. For example, the protection device of the present invention has nickel foils or nickel plated copper foils as the separate metal layers on the both main surfaces of the PTC laminar element, and has a metal layer which forms the electrically conductive metal thin layer and the fuse layer which are formed by nickel-plating, preferably nickel-plating and tin-plating.

Figure 2:
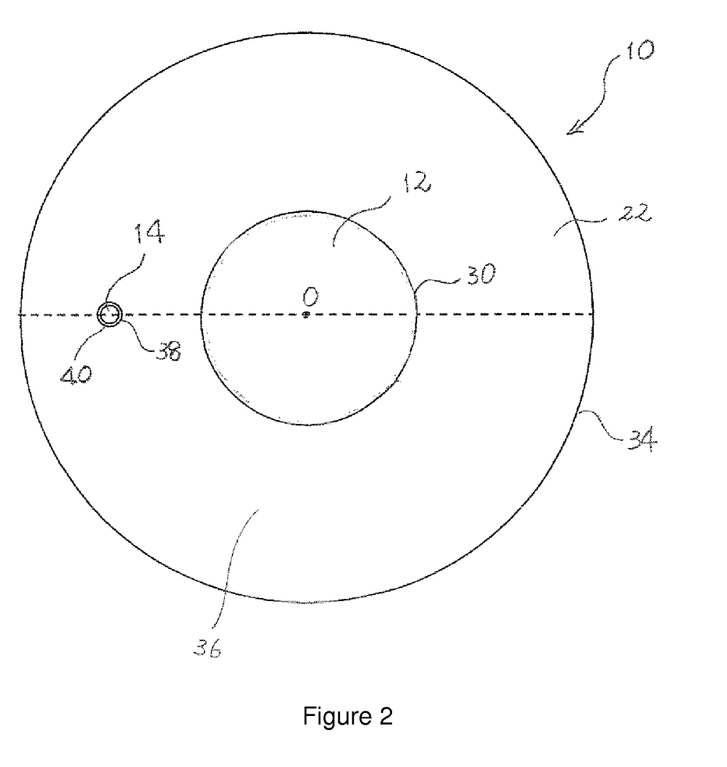
FIG. 2 schematically shows in a plane view the protection device which is shown in FIG. 1.

The shape of the PTC laminar element is not particularly limited as long as its dimension along the thickness direction is smaller, preferably considerably smaller than the other dimensions (for example, a sheet-shape). The planar shape of the PTC laminar element (a figure seeing the laminar element just above, and for example, a profile of the protection device as shown in FIG. 2) or the cross-section shape of the laminar element in a direction perpendicular to the thickness direction of the PTC laminar element is preferably an axisymmetric and/or point-symmetric shape, and for example, a circular shape, a square shape, a rhombus shape, a rectangle shape or an annular shape (in particular, a circular ring shape, a so-called doughnut shape).

In particular, it is preferable that the PTC laminar element is preferably in an annular shape, particularly a circular ring shape. When it is in the annular shape, a central opening, for example a central circular opening in the case of the circular ring shape, may be the throughhole of the present invention. Furthermore, the PTC laminar element may have one or more additional throughholes, for example a throughhole whose cross-section is in a circular shape in a portion between an inner periphery and an outer periphery which define the annular shape.

The protection device of the present invention has a fuse layer which is positioned on a side surface defining said at least one of the above described throughhole(s) and electrically connects the electrically conductive metal thin layers each of which is positioned on each of the both main surfaces of the PTC laminar element.

A metal constituting the above described fuse layer is not particularly limited as long as it is electronically conductive, for example includes Ni, Cu, Ag, Au, Al, Zn, Rh, Ru, Ir, Pd, Pt, an Ni—P alloy, an Ni—B alloy, Sn, an Sn—Ag alloy, an Sn—Cu alloy, an Sn—Ag—Cu alloy, an Sn—Ag—Cu—Bi alloy, an Sn—Ag—Cu—Bi—In alloy, an Sn—Ag—Bi—In alloy, an Sn—Ag—Cu—Sb alloy, an Sn—Sb alloy, an Sn—Cu—Ni—P—Ge alloy, an Sn—Cu—Ni alloy, an Sn—Ag—Ni—Co alloy, an Sn—Ag—Cu—Co—Ni alloy, an Sn—Bi—Ag alloy, an Sn—Zn alloy, an Sn—In alloy, an Sn—Cu—Sb alloy, an Sn—Fe alloy, a Zn—Ni alloy, a Zn—Fe alloy, a Zn—Co alloy, a Zn—Co—Fe alloy, an Sn—Zn alloy, an Ni—Au alloy, a Pd—Ni alloy and an Sn—Bi alloy.

A thickness of the fuse layer is not particularly limited, and it is for example, preferably 0.001-0.02 mm, and more preferably 0.002-0.015 mm. When the thickness of the fuse layer is less than 0.001 mm, it is difficult to form a uniform plated layer and a pin hole or the like may be generated. On the other hand, when the thickness of the fuse layer is more than 0.02 mm, a cost and time for plating increase. In this case, it is preferable to adjust characteristics of the protection device by increasing the number of the throughholes or a diameter of the throughholes.

The above described fuse layer may comprise two metal layers having a different melting point from each other, that is, a first metal layer formed from a metal having a higher melting point and a second metal layer formed from a metal having a lower melting point. When the above described metal layers are laminated, an order of laminating them is not limited and can be appropriately selected depending on product requirements. For example, when a corrosion resistance property is required, a metal forming an outermost layer can be Ni or the like. It is preferable that the metal layers are laminated, although the present invention is not limited thereto. The metal layers can be formed separately as long as each of the metal layers electrically connects the electrically conductive metal thin layers each of which is positioned on each of the both main surfaces of the PTC laminar element. For example, one metal layer may be formed on a half of a peripheral surface of the throughhole and the other metal layer may be formed on the other half of the peripheral surface.

The metal having the higher melting point is not limited but includes, for example, Ni, Cu, Ag, Au, Al, Zn, Sn, an Ni—Au alloy, an Ni—P alloy, and an Ni—B alloy. It is preferable that the above described first metal layer is formed by electroless plating with the metal having a higher melting point, although the present invention is not limited thereto.

The metal having the lower melting point is not limited but includes, for example, Sn, an Sn—Ag alloy, an Sn—Cu alloy, an Sn—Ag—Cu alloy, an Sn—Ag—Cu—Bi alloy, an Sn—Ag—Cu—Bi—In alloy, an Sn—Ag—Bi—In alloy, an Sn—Ag—Cu—Sb alloy, an Sn—Sb alloy, an Sn—Cu—Ni—P—Ge alloy, an Sn—Cu—Ni alloy, an Sn—Ag—Ni—Co alloy, an Sn—Ag—Cu—Co—Ni alloy, an Sn—Bi—Ag alloy and an Sn—Bi alloy, preferably Sn, the Sn—Cu alloy and the Sn—Bi alloy, more preferably Sn. It is preferable that the metal having a lower melting point has a melting point lower than a decomposition temperature of a polymer material of the PTC composition constituting the PTC laminar element. By use of the electrically conductive metal having a melting point lower than the decomposition temperature of the polymer material of the PTC composition constituting the PTC laminar element, when an excessive current flows, the fuse layer is cut off before its temperature the reaches the decomposition temperature of the polymer material, so that the decomposition of the polymer material can be prevented. The decomposition temperature of the insulation resin means a temperature at which the insulation resin decomposes, and can be measured, for example, by using a Thermogravimetry/Differential Thermal Analysis (TG-DTA) spectrometer. For example, when the insulation resin is a high density polyethylene, a gradual decrease of weight is observed during 300-550° C. in air, in particular, at a temperature of not less than 400° C. a drastic decrease of weight occurs. That is, the deposition temperature is 400° C. The second metal layer is preferably formed by electrolytic plating with the above described metal having lower melting point on the above described first metal layer, although the present invention is not limited thereto.

A thickness ratio between the first metal layer and the second metal layer in the fuse layer is not particularly limited as long as desired characteristics can be obtained, but for example, is 1:100-5:1, preferably 1:25-3:5, and more preferably 1:25-3:10.

The fuse layer may further comprise one or more other metal layers in addition to the first metal layer and the second metal layer. A melting point of the other metal layer(s) may be the same as or different from the melting point of the metal constituting the first metal layer or the second metal layer. Preferably, the melting point of the other metal layer(s) is not less than that of the second metal layer, more preferably, not more than the first metal layer and not less than that of the second metal layer.

Although the present invention is not bound by any theory, it is conceived that the protection device of the present invention interrupts the excessive current as follows. When an excessive current is just about to flow from one electrically conductive metal thin layer to the other electrically conductive metal thin layer, the excessive current flows preferentially through the fuse layer having a lower resistance than that of the PTC element, as the result of which, the fuse layer is fused by a Joule heat generated. As a result, though the excessive current flowing through the fuse layer becomes to flow through the PTC laminar element, a resistance of the PTC laminar element becoming a high temperature by the Joule heat increases (hereinafter, such state is referred to as "trip"), and thereby the excessive current is interrupted. In the protection device of the present invention, since the current is diverted into the PTC laminar element when the fuse layer is fused, so that generation of an arc is suppressed, namely, a voltage resistance is superior. Further, the protection device of the present invention has a resettability in that its resistance returns to a resistance close to its original when its temperature is lowered so that the resistance of the PTC element is decreased while the cause of the excessive current is removed even through the fuse layer has been fused.

Additionally, although the present invention is not bound by any theory, when the fuse layer comprises the first metal layer and the second metal layer, it may be considered that fusing occurs as follows. When an excessive current flows from one electrically conductive metal thin layer to the other electrically conductive metal thin layer, the excessive current flows preferentially through the fuse layer having a lower resistance than that of the PTC laminar element, as the result of which, firstly the second metal layer consisting of the metal having a lower melting point is fused by a generated Joule heat. As the result, since the current flowing through the second metal layer is diverted to the first metal layer and the current flowing through the first metal layer increases, and thereby the first metal layer is rapidly fused. When the fuse layer comprises three or more metal layers, similarly to the above, a metal having the lowest melting point is firstly fused, as the result of which, the current is diverted into the other metal layer and the current flowing through these metal layer increases. Such fusing of the metal layer and such diverting of the current is repeated, as the result of which, the fuse layer is rapidly fused and the excessive current is rapidly and surely interrupted.

When the fuse layer is made of a metal having a higher melting point such as Ni, it becomes easy to increase a rated capacity of the protection device, and this fuse layer can interrupt the excessive current when the excessive current reaches more than double, for example, more than four times the rated capacity. Additionally, in case that the fuse layer comprises the first metal layer and the second metal layer, even when an excessive current is of a relatively smaller ratio of the rated capacity, for example, an excessive current is 1.2-4 times, preferably 1.5-2.0 times the rated capacity, the second metal layer is firstly fused and the current flowing through the whole of the fuse layer is concentrated to the first metal layer, as the result of which the first metal layer is rapidly fused, so that the excessive current can be rapidly and surely interrupted with suppressing the generation of the arc.

In the protection device of the present invention, before the fuse layer is fused, a current from one electrically conductive metal thin layer to the other electrically conductive metal thin layer usually flows mainly via the fuse layer having relatively lower resistance than that of the PTC element. After the fuse layer is fused, this current flows via the PTC element, therefore, the protection device of the present invention can be repeatedly used as a PTC device.

When one throughhole which has the fuse layer on its side surface is provided, it is preferable that the PTC laminar element is in an annular shape or other suitable planar shape which originally has no hole, and the throughhole (also referred to as "a central throughhole") is provided at its center (when such center is present, for example as in the case of the PTC laminar element whose planar shape is circular (i.e. a disk shape)). As the result, the PTC laminar element properly has the circular ring shape. The current which flows over the electrically conductive metal thin layer on one main surface of the PTC laminar element having the circular ring shape flows toward one end of the throughhole, and then passes through the fuse layer and flows from the other end of the throughhole and radially over the electrically conductive metal thin layer on the other main surface of the PTC laminar element.

In the embodiment wherein the PTC laminar element is provided with one throughhole as described above, in comparison with an embodiment which is described in detail below wherein a plurality of throughholes are provided, it is preferable to provide a larger throughhole as the central throughhole at the center of the circular element, and the fuse layer is provided on the side surface of such throughhole. Since such protection device allows its resistance to lower, it can be suitably used when a large amount of a current (preferably 20 A or more of the current, for example 30-40 A or more of the current, and for example 50 A) flows. Additionally, since only one throughhole is provided, the production of the protection device becomes simple.

In a preferable embodiment, the PTC laminar element is in a circular ring shape which is defined by an inner periphery 30 and an outer periphery 34 as shown FIG. 2 or 5 which are described below. Preferably, a diameter of a circle which defines the inner periphery of the laminar element is for example 6-16 mm, and a diameter of a circle which defines the outer periphery is for example 13-24 mm. As the protection device when 30-40 A of the current flows, it is preferable that the diameter of the circle of the inner periphery is for example 6.5 mm, and the thickness of the fuse layer is for example 0.01 mm.

When a plurality of the throughholes are provided, it is preferable to arrange the throughholes such that the current passing through the PTC laminar element flows through the fuse layer on each of the throughholes as evenly as possible. For example, a plurality of the throughholes (also referred to as "surrounding throughholes") each of which has the same cross-sectional shape and same size may be provided through a ring part of the annular PTC laminar element having the central throughhole (i.e. in a main body of the PTC laminar element which is defined by the inner periphery and the outer periphery). In this case, it is preferable to provide the throughholes equiangularly as to the center of the circle of the inner periphery which defines the circular ring shape. For example, the throughholes are provided every 180° to form two throughholes, every 120° to form three throughholes, every 90° to form four throughholes or every 60° to form six throughholes. However, the PTC laminar element may have only one surrounding throughhole depending on a condition of using the protection device. Therefore, the number of surrounding throughhole may be for example 1-6.

When the diameter of the circle of the inner periphery which defines the annular PTC laminar element, i.e. the diameter of a cross-sectional circle of the central throughhole is the same as or smaller than the diameter of other throughholes, i.e. the diameter of the surrounding throughholes, the fuse layer may also be provided on a side surface which defines the central throughhole. Conversely, when the diameter of the cross-section of the central throughhole is larger than the diameter of the surrounding throughhole, it is preferable that the fuse layer is not provided on the side surface which defines the central throughhole.

Whether or not the fuse layer is provided on the central throughhole is determined based on whether or not the current flows substantially evenly through the fuse layer on each of the throughholes of the protection device. Simply, in the case wherein the central throughhole has a larger circular cross-section than that of the surrounding throughhole, the fuse layer on the central throughhole lowers the significance of providing the fuse layer on the other throughholes since substantially most of the current flowing through the protection device likely flows through the fuse layer provided on the central throughhole while it is unlikely to flow through the fuse layers provided on the other throughholes having the smaller circular cross-section.

In one preferable embodiment, the PTC laminar element is an annular element which is defined by an outer periphery and an inner periphery, and a throughhole is defined by the inner periphery, and further, other throughhole(s) may be present while passing through the inside of the PTC laminar element, i.e. between the inner periphery and the outer periphery which define the PTC laminar element (namely, a portion of the PTC composition resin which define the PTC laminar element) to exist as the surrounding throughhole. Therefore, in this case, there are, in the PTC laminar element, the central throughhole (one) which is defined by the inner periphery and at least one throughhole (corresponding to the above surrounding throughhole) which passes through the main body of the PTC laminar element.

In this embodiment, the fuse element exists on the side surface (i.e. a wall) which defines the surrounding throughhole. In the case where the diameter of the central throughhole is not so different from the diameter of the surrounding throughhole and the fuse layer is also present on the central throughhole, when it is predicted that the current which is equivalent to that flowing through the fuse layer on the surrounding throughhole would flow through the fuse layer on the central throughhole, the fuse layer may also be provided to the central throughhole. In the case where the diameter of the central throughhole is larger than the diameter of the surrounding throughhole(s) and the fuse layer is present on the central throughhole, when it is predicted that the far larger current than that flowing through the fuse layer on the surrounding throughhole(s) flows through the fuse layer on the central throughhole, the fuse layer is not provided to the central throughhole, since there is no significance of providing the fuse layer on the surrounding throughhole.

Therefore, in one embodiment of the protection device which has an annular PTC laminar element for example a circular-ring shaped PTC laminar element having a plurality of the throughholes, the central throughhole does not have a fuse layer and a plurality of the surrounding throughholes which are circumferentially positioned around the central throughhole have the fuse layers. The number of the circumference along which the surrounding throughholes are provided is generally preferably single, and in some cases, the number may be plural, for example, double or triple circumferences. In the embodiment wherein the fuse layer is provided only on the surrounding throughhole, a resistance of the protection device can be controlled with the number of the provided surrounding throughholes. Therefore, compared to the above described embodiment wherein the fuse layer is provided only to the central throughhole, there is an advantage in that the resistance of the protection device can be easily and precisely varied by simply changing the number of the provided throughholes.

When the PTC laminar element is in an annular shape, for example a circular ring shape, it is preferable that the surrounding throughholes are positioned symmetrically to the center of the PTC laminar element. When there is a plurality of the surrounding throughholes, it may be constituted such that they exist at an equal angle interval around for example the center of for example the annular element, i.e. around the center of a graphic which defines the inner periphery, for example around the center of a circle. For example, two throughholes may be located at every 180°, three throughholes may be located at every 120°, or four throughholes may be located at every 90°.

In a specific embodiment, the diameter of the central throughhole (where the fuse layer is not provided) is 6-16 mm, and the diameter of the cross-section circle of the surrounding throughhole (where the fuse layer is provided) around the central throughhole is 0.2-1 mm. In this embodiment, it is preferable that an outside diameter of the PTC laminar element is for example 13-24 mm. In the protection device when 20-30 A of current flows, it is preferable to provide, for example eight surrounding throughholes of which diameter is 0.6 mm, and the thickness of the fuse layer is, for example 0.008 mm.

It is noted that in any embodiment, the cross-sectional shape of the throughhole may be other suitable are, and preferably an annular shape. In other embodiment, it may be a square shape, a rectangle shape, a rhombus shape, a triangle shape, or the like. In this case, the above diameter corresponds to an equivalent diameter of the other cross-sectional shape.

Therefore, in order that the fuse layer melts with a predicted amount of the excessive current, various factors such as a cross-sectional shape of the throughhole, a size (usually, a diameter) and a length along the thickness direction of the throughhole, a metal material and a thickness of the fuse layer, as well as the number of and an arrangement of the throughholes, and the like are chosen, and values and the like of them are selected as prescribed. Those skilled in the art can conduct this selection for these factors, for example, by trial-and-error.

In one preferable embodiment, the electrically conductive metal thin layer and the fuse layer are integrally formed by plating with the electrically conductive metal, preferably plating with the metal having the higher melting point and plating with the metal having the lower melting point, and more preferably Ni-plating and Sn-plating. In this embodiment, the fuse layer consists of the first metal layer (Ni plate) and the second metal layer (Sn plate). When the electrically conductive metal thin layer and the fuse layer are formed to be integral, there is an advantage that the electrically conductive metal thin layer and the fuse layer can be simultaneously and integrally formed by plating the PTC laminar element having the throughhole with an electrically conductive metal. That is, the fuse layer and the electrically conductive metal thin layer are formed from the same kind of metals. As a plating method for forming the fuse layer and the electrically conductive metal thin layer, an electrolytic plating method or an electroless plating method can be used.

In a particularly preferable embodiment, the metal foil, preferably the nickel foil or the nickel plated copper foil which adheres closely to the PTC laminar element beforehand is present between the PTC laminar element and the electrically conductive metal thin layer. In this case, the electrically conductive metal thin layer which is formed as the plating layer can adhere closely to the metal foil, so that there is an advantage that the electrically conductive metal thin layer can be strongly bonded to the PTC laminar element via the metal foil.

In order to protect a circuit to be protected or an electrical element constituting it, the protection device of the present invention is positioned between the first electrical element (for example, a secondary battery) and the second electrical element (for example, a battery charger) as other electrical element so as to directly or indirectly connect them electrically. As a result, one electrically conductive metal thin layer directly or indirectly contacts the first electrical element, and the other electrically conductive metal thin layer directly or indirectly contacts the second electrical element. Therefore, the present invention also provides an electrical apparatus which comprises the protection device of the present invention and a circuit and/or an electrical element which is electrically connected with the protection device.

The protection device of the present invention has the electrically conductive metal thin layers on the both main surfaces of the PTC laminar element formed from the PTC composition and the fuse layer electrically connecting them, and enable a large amount of the current to flow due to the fuse layer formed from the electrically conductive metal having a low resistance. At the sometime, when the excessive current flows, the current flows preferentially through the fuse layer, as the result of which, the fuse layer is fused by a Joule heat generated and the current flowing through the fuse layer becomes to flow through the PTC laminar element, and thereby the PTC element trips and becomes a high temperature state by the Joule heat, so that the current is interrupted. Additionally, with the protection device of the present invention, since the current is diverted into the PTC element when the fuse layer is fused and the generation of arc is suppressed, a voltage resistance is superior. Furthermore, the protection device of the present invention has a resettable function that a resistance value of the protection device returns near to its initial value after the causes for the excessive current is eliminated and its temperature decreases.

DETAILED DESCRIPTION OF THE INVENTION

Figure 1:
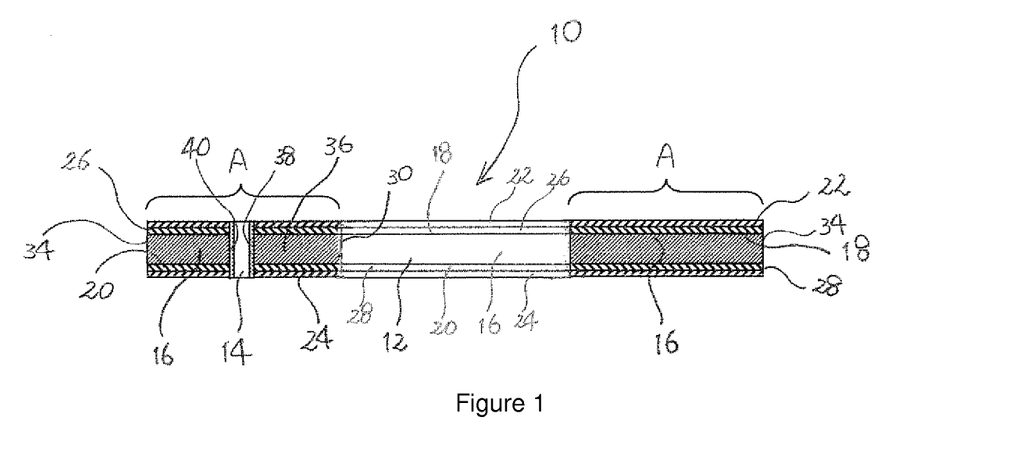
FIG. 1 schematically shows a protection device of the present invention in a cross-sectional view along its thickness-direction.

The protection device of the present invention will be described in detail with reference to the accompanied drawings. In FIG. 1, one embodiment of the protection device of the present invention is schematically shown in a cross-sectional view along its thickness-direction (a portion which appears as the cut plane is indicated with an arrow "A"). Also, in FIG. 2, the protection device shown in FIG. 1 is schematically shown in a plane view. Furthermore, in FIG. 3, a fuse layer in the protection device shown in FIGS. 1 and 2 is schematically shown in a cross-sectional view.

The illustrated protection device 10 comprises an annular PTC laminar element 16 which is formed of the PTC composition and has at least one throughhole (in the illustrated embodiment, two throughholes of a central throughhole 12 having a circular cross-section and a surrounding throughhole 14 having a circular cross-section). The protection device 10 comprises electrically conductive metal thin layers 22 and 24 which are positioned on both main surfaces 18 and 20 respectively of the PTC laminar element 16. It is noted that in the illustrated embodiment, separate metal layers 26 and 28 are present between the PTC laminar element 16 and the electrically conductive metal thin layers.

In the illustrated embodiment, the fuse layer is absent on an inner periphery 30 of the circular ring which defines the central throughhole, i.e. on a side surface inside of the annular ring. In the illustrated embodiment, a fuse layer 40 is present on a peripheral side surface 38 which defines the surrounding throughhole 14 positioned through a main body 36 of the laminar element between the inner periphery 30 and the outer periphery 34.

Figure 3:
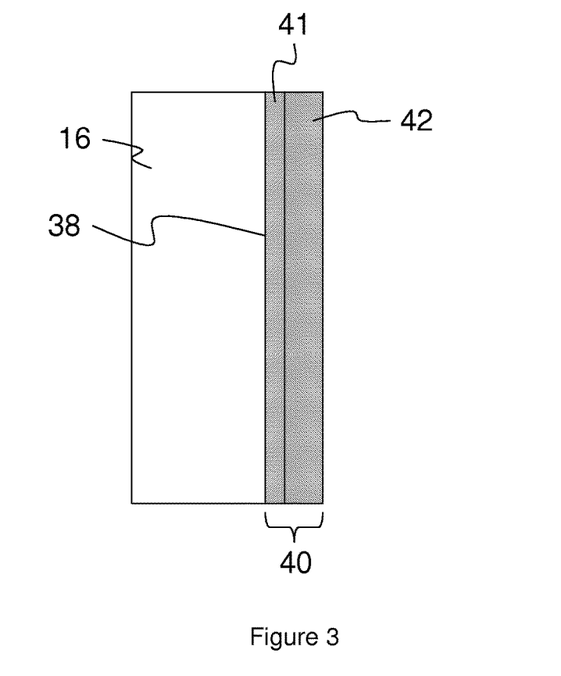
FIG. 3 schematically shows in a cross-sectional view a fuse layer in the protection device which is shown in FIGS. 1 and 2.

In a preferable embodiment, as shown in FIG. 3, the fuse layer 40 may comprises a first metal layer 41 located on the peripheral side surface 38 which defines the surrounding throughhole 14 and a second metal layer 42 located on the first metal layer 41.

In the illustrated embodiment, the surrounding throughhole 14 having the fuse layer 40 is only one which is provided at the midpoint of the main body 36 along the diameter (shown with a broken line in FIG. 2) passing through a center "O" of the PTC laminar element, but such surrounding throughhole may be provided at the opposite side along the diametrical direction. In this case, it results in providing surrounding throughholes at every 180° (totally providing two throughholes) around the center "O". In a further other embodiment, three, four, six or eight of the surrounding throughholes having the fuse layer may be provided at an equal angle interval of 120°, 90°, 60° or 45° around the center "O" of the circle, respectively.

It is noted that since the diameter of the central throughhole is far larger than the diameter of the surrounding throughhole, the fuse layer is absent on the side surface of the inner periphery 30 of the annular ring. However, the fuse layer may be provided on the side surface of the inner periphery 30 of the annular ring if necessary when the diameter of the central throughhole is the similar to or smaller than the diameter of the surrounding throughhole. It is noted that in a certain embodiment, when a convex part corresponding to the central throughhole is provided to an electrical apparatus to which the protection device is to be disposed, the protection device may be located on the electrical apparatus by fitting the convex part into the large diameter part of the central throughhole. For example, such convex part is provided on a sealing plate of a secondary battery cell, so that the convex part is fitted into the central throughhole, and thereby enabling to position the protection device on the sealing plate.

In other embodiment, the PTC laminar element 16 does not have the central throughhole 12 (therefore, the PTC laminar element is in a disk-shape) and has only at least one surrounding throughhole 14 which may have the fuse layer 40.

Figure 4:
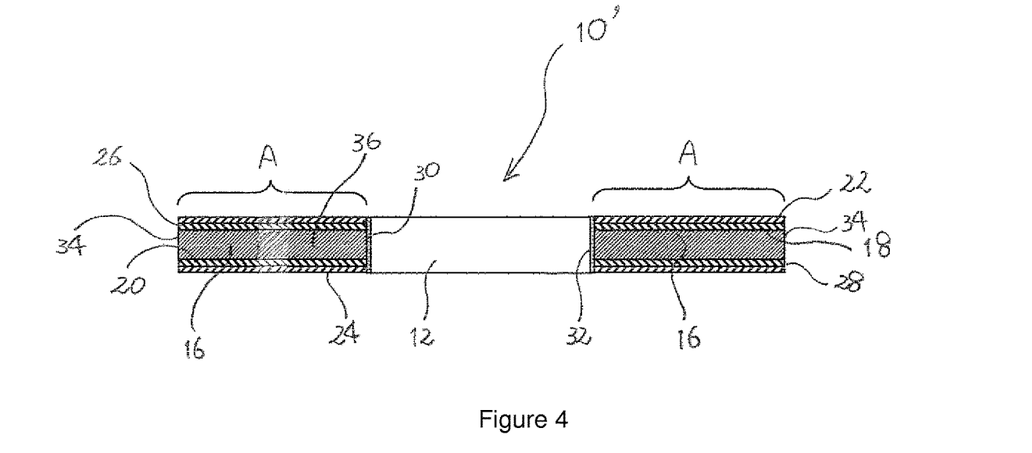
FIG. 4 schematically shows a protection device of the present invention of other embodiment in a cross-sectional view along its thickness-direction.
Figure 5:
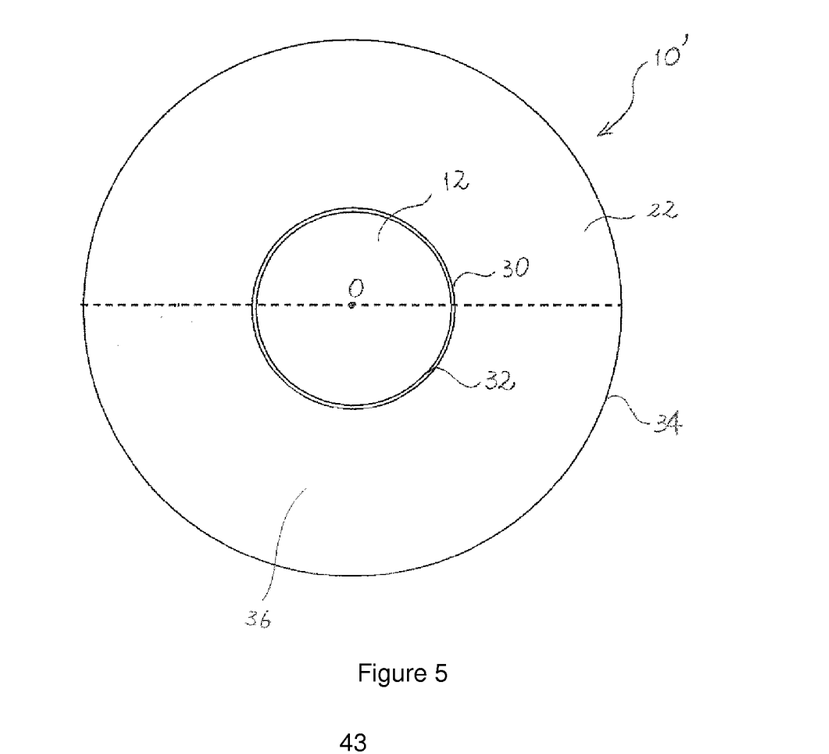
FIG. 5 schematically shows the protection device in a plane view which is shown in FIG. 4.
Figure 6:
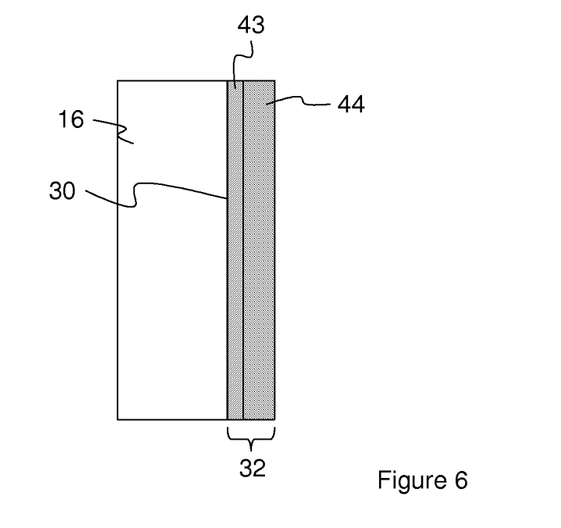
FIG. 6 schematically shows in a cross-sectional view a fuse layer in the protection device which is shown in FIGS. 4 and 5.

A protection device 10' of a further another embodiment of the present invention is shown in FIGS. 4 and 5 similarly to FIGS. 1 and 2. A fuse layer 32 in the preferable embodiment of the protection device shown in FIGS. 4 and 5 is shown in FIG. 6 similarly to FIG. 3. It is noted that the same reference numerals are used for the same elements as in FIGS. 1-3. In the illustrated embodiment, the PTC laminar element 16 does not have the surrounding throughhole 14 and has only the central throughhole 12 which has the fuse layer 32. In a preferably embodiment, the fuse layer 32 may comprises a first metal layer 43 located on the inner periphery 30 which defines the central throughhole 12 and a second metal layer 44 located on the first metal layer 43.

EXAMPLE 1

The protection device of the present invention shown in FIGS. 1 and 2 was produced. Therefore, the protection device 10 was produced which has only the fuse layer 40 but does not have the fuse layer 32. It is noted that eight surrounding throughholes 14 were circumferentially formed at an equal angle interval.

First, a sheet (a thickness of 0.3 mm; corresponding to the laminar element 16) of PTC composition (a high density polyethylene containing a carbon black particulate material) was prepared, nickel foils (having a thickness of 22 µm, corresponding to the separate metal layers 26 and 28) were positioned on the both side of the sheet, and they were pressed while heating to be integral to obtain a pressure-bonded product wherein the nickel foils were applied to the both main surfaces.

Throughholes (corresponding to the surrounding throughhole 14) which were of 0.6 mm in a diameter were formed at prescribed positions of the pressure-bonded product, and then plating the pressure-bonded product with Ni by an electrolytic plating process. The thickness of the nickel layer which was formed by plating was about 0.008 mm. Then, the annular element was stamped out from the pressure-bonded product to obtain the protection device 10 of the present invention wherein eight throughholes were positioned in place at every 45° around the center of the annular element as prescribed.

The diameter of the outer peripheral circle 34 of the obtained circular annular element was 15 mm, and the diameter of the obtained inner peripheral circle 30 (i.e. the diameter of the central throughhole) was 6.4 mm. This circular annular element had nickel foils functioning as the separate metal layers 26 and 28 on the both main surfaces of the laminar element 16, and had the surrounding throughholes 14 at the midpoint of the maim body 36 which was a part of the circular annular element. Also, the circular annular element had plated layers as the electrically conductive metal thin layers 22 and 24 on the nickel foils, and had plated layers functioning as the fuse layers 40 on the inner peripheral surfaces which define the surrounding throughholes.

EXAMPLE 2

The protection device of the present invention was obtained similarly to Example 1 except that plating process after the formation of the throughholes (corresponding to the surrounding throughholes) was performed by Ni-plating with an electroless plating process and Sn-plating with an electrolytic plating process to obtain a nickel layer having a thickness of about 1.5 µm (corresponding the first metal layer 41) and an Sn layer having a thickness of about 6.5 µm (corresponding the second metal layer 42).

Experiment 1

A current (with 60 Vdc) listed in following Table 1 was passed through the protection device of Examples 1 and 2 from one electrically conductive metal thin layer 22 to the other electrically conductive metal thin layer 24. The maximum value of current which continues to flow without blowing for 10 minutes was defined as "rated capacity". As a result, the rated capacity of the protection device of Example 1 was 25 A and the rated capacity of the protection device of Example 2 was 22.5 A.

Experiment 2

A current four times the rated capacity defined in Experiment 1 (with 60 Vdc) was applied from one electrically conductive metal thin layer 22 to the other electrically conductive metal thin layer 24 of the protection devices of the Examples 1 and 2 and a current-interrupting time was measured. As a result, the current-interrupting time is within one second in the protection devices of both the Examples.

Experiment 3

After interrupting the excessive current in Experimental Example 2, the applied current was stopped and the protection device was allowed to stand for 10 minutes. Then, a current of 100 A (with 60 Vdc) was passed from one electrically conductive metal thin layer 22 to the other electrically conductive metal thin layer 24 for 6 seconds, and its trip performance checked as to whether the PTC device was activated (tripped). After applying the current for 6 seconds, the current (and voltage) was stopped for 54 seconds. This sequence was defined as one cycle, and each sample was subjected to ten cycles. As a result, it was confirmed that the both samples had the PTC property without firing or fuming.

The results of Experiments 1-3 are shown in following Table 1.

TABLE 1

|  |  | Example 1 | Example 2 |
|---|---|---|---|
|  | Electroless plated material | Ni | Ni |
|  | Electrolytic plated material | Ni | Sn |
|  | Thickness of electroless plate (μm) | 1.5 | 1.5 |
|  | Thickness of electrolytic plate (μm) | 6.5 | 6.5 |
|  | Total plate thickness (μm) | 8.0 | 8.0 |
|  | Higher melting point plate/Lower melting point plate ratio (%) | 23.1 | 23.1 |
| Experiment 1 | Test current 10 A | No blowing for 10 minutes | No blowing for 10 minutes |
|  | Test current 15 A | No blowing for 10 minutes | No blowing for 10 minutes |
|  | Test current 20 A | No blowing for 10 minutes | No blowing for 10 minutes |
|  | Test current 22.5 A | No blowing for 10 minutes | No blowing for 10 minutes |
|  | Test current 25 A | No blowing for 10 minutes | — |
| Experiment 2 | Time to blowing (Test current: four times the rated capacity) | 0.46 second (100 A) | 0.32 second (90 A) |
| Experiment 3 | 100 A (60 Vdc) On for 6 seconds, Off for 54 seconds, 10 cycles | having PTC property without firing or fuming | having PTC property without firing or fuming |

From these results, it has been confirmed that the protection device of the present invention provides protection from an excessive current while allowing a relatively large amount of current such as a the current of 20-25 A to continuously flow. Additionally, it has been confirmed that the current can be continually applied again by eliminating the cause for the excessive current.

The protection device of the present invention can be used as a protection device which interrupts an excessive current when the excessive current flows in an electrical apparatus such as a secondary battery. The protection device of the present invention can also be used as an alternative to a nickel washer, a washer in which a stainless material is nickel-plated or the like which is for example incorporated into a sealing plate in a cylindrical lithium ion secondary battery cell. In this case, since the protection device has the PTC laminar element which is formed of the PTC composition, the function of the protection device as a washer is increased due to elasticity of the resin. Therefore, the present invention can also be used as a washer which has characteristics of the protection device of the present invention as described above.

THE ELEMENT REFERENCE NUMERALS ARE 10, 10'—protection device; 12—central throughhole 14—surrounding throughhole; 16—laminar element 18, 20—main surface;

22, 24—electrically conductive metal thin layer 26, 28—other metal layer; 30—inner periphery 32—fuse layer; 34—outer periphery 36—main body; 38—side surface; 40—fuse layer 41—first metal layer; 42—second metal layer 43—first metal layer; 44—second metal layer

What is claimed is:

1. A protection device comprising:
an annular PTC laminar element formed of a PTC composition and having a central throughhole and at least one surrounding throughhole;
an annular metal foil disposed on each main surface of the PTC laminar element and coaxial with the PTC laminar element;
an annular electrically conductive metal thin layer disposed on each of the metal foils and coaxial with the PTC laminar element; and
a fuse layer which is positioned on a side surface defining at least one of said at least one surrounding throughhole and electrically connecting the electrically conductive metal thin layers;
wherein the fuse layer comprises a first metal layer having a first thickness and a second metal layer having a second thickness greater than the first thickness, and wherein a side surface defining the central throughhole does not include a fuse layer disposed thereon.

2. The protection device according to claim 1, characterized in that the first metal layer consists of a metal having a higher melting point than a melting point of a metal from which the second metal layer is formed.

3. The protection device according to claim 2, characterized in that the metal having the higher melting point is Ni.

4. The protection device according to claim 2, characterized in that the metal having the lower melting point has a melting point lower than a decomposition temperature of a polymer material of the PTC composition.

5. The protection device according to claim 4, characterized in that the metal having the lower melting point is Sn, an Sn—Cu alloy or an Sn—Bi alloy.

6. The protection device according to claim 2, characterized in that the first metal layer is formed by electroless plating with the metal having the higher melting point and the second metal layer is formed by electrolytic plating with the metal having the lower melting point on the first metal layer.

7. The protection device according to claim 2, characterized in that a thickness ratio between the first metal layer and the second metal layer is 1:100-5:1.

8. The protection device according to claim 1, characterized in that the metal foil is a nickel foil.

9. An electrical apparatus comprising the protection device according to claim 1.

10. A washer comprising:
an annular PTC laminar element formed of a PTC composition and having a central throughhole and at least one surrounding throughhole,
an annular metal foil positioned on each main surface of the PTC laminar element and coaxial with the PTC laminar element;
an annular electrically conductive metal thin layer disposed on each of the metal foils and coaxial with the PTC laminar element, and
a fuse layer positioned on a side surface defining at least one of said at least one surrounding throughhole and electrically connecting the electrically conductive metal thin layers;
wherein the fuse layer comprises a first metal layer having a first thickness and a second metal layer having a second thickness greater than the first thickness, and wherein a side surface defining the central throughhole does not include a fuse layer disposed thereon.

11. The protection device according to claim 10, characterized in that the first metal layer consists of a metal having a higher melting point than a melting point of a metal from which the second metal layer is formed.

* * * * *